(12) United States Patent
Saylor et al.

(10) Patent No.: US 9,680,908 B1
(45) Date of Patent: Jun. 13, 2017

(54) IDENTIFYING A SIGNER OF AN ELECTRONICALLY SIGNED ELECTRONIC RESOURCE

(71) Applicant: MicroStrategy Incorporated, Vienna, VA (US)

(72) Inventors: Michael J. Saylor, Vienna, VA (US); Hector Vazquez, Ashburn, VA (US); Gang Chen, Vienna, VA (US); Sergey Mironenko, Ellicott City, MD (US)

(73) Assignee: MicroStrategy Incorporated, Vienna, VA (US)

( * ) Notice: Subject to any disclaimer, the term of this patent is extended or adjusted under 35 U.S.C. 154(b) by 351 days.

(21) Appl. No.: 13/943,084

(22) Filed: Jul. 16, 2013

Related U.S. Application Data

(60) Provisional application No. 61/731,980, filed on Nov. 30, 2012.

(51) Int. Cl.
| | | |
|---|---|---|
| *G06F 15/16* | (2006.01) | |
| *H04L 29/08* | (2006.01) | |
| *G06F 21/62* | (2013.01) | |
| *G06F 21/60* | (2013.01) | |
| *G06F 12/14* | (2006.01) | |

(52) U.S. Cl.
CPC .............. *H04L 67/02* (2013.01); *G06F 21/62* (2013.01); *G06F 12/1416* (2013.01); *G06F 21/60* (2013.01); *G06F 21/6218* (2013.01)

(58) Field of Classification Search
CPC ....... H04L 63/08; H04L 63/10; H04L 63/083; G06F 21/10; A01H 1/02

USPC .................. 709/229, 206; 726/26, 7, 5, 6, 4
See application file for complete search history.

(56) References Cited

U.S. PATENT DOCUMENTS

| | | | |
|---|---|---|---|
| 8,689,297 B2* | 4/2014 | Pasquero et al. ................. 726/6 |
| 8,949,708 B2* | 2/2015 | Peterson ............... G06F 21/645 |
| | | | 715/234 |
| 2004/0230657 A1* | 11/2004 | Tomkow ....................... 709/206 |
| 2006/0085351 A1* | 4/2006 | Hug ................................. 705/59 |

(Continued)

OTHER PUBLICATIONS

Wikipedia, "Certificate authority," Wikipedia [online] Aug 8, 2012 [retrieved on Aug. 15, 2012]. Retrieved from the Internet: <URL: http://en.wikipedia.org/wiki/Certificate_authority>, 4 pages.

(Continued)

*Primary Examiner* — Dhairya A Patel
(74) *Attorney, Agent, or Firm* — Fish & Richardson P.C.

(57) ABSTRACT

A method comprising: storing, at a server, an electronic resource that has been electronically signed by a user; associating the electronic resource with an identifier; receiving, at the server and from a client device, a request to identify the user who electronically signed the electronic resource, the request including a reference to the identifier; responsive to receiving the request to identify the user who electronically signed the electronic resource, identifying, based on the reference to the identifier, the electronic resource stored at the server; responsive to identifying the electronic resource stored at the server, identifying the user who electronically signed the identified electronic resource; and transmitting, from the server to the client device, an indication of an identity of the user who electronically signed the electronic resource.

17 Claims, 8 Drawing Sheets

(56) References Cited

U.S. PATENT DOCUMENTS

| | | | |
|---|---|---|---|
| 2007/0277040 A1* | 11/2007 | Scheidt et al. | 713/176 |
| 2008/0263050 A1* | 10/2008 | Randazzo et al. | 707/10 |
| 2009/0025087 A1* | 1/2009 | Peirson, Jr. | G06Q 10/00 726/27 |
| 2009/0271265 A1* | 10/2009 | Lay et al. | 705/14.38 |
| 2012/0191979 A1* | 7/2012 | Feldbau | H04L 63/126 713/178 |
| 2012/0284602 A1* | 11/2012 | Seed | G06Q 20/3274 715/224 |
| 2013/0019289 A1* | 1/2013 | Gonser | G06F 21/64 726/6 |
| 2014/0115034 A1* | 4/2014 | Cohen et al. | 709/203 |

OTHER PUBLICATIONS

Wikipedia, "Certificate signing request," Wikipedia [online] Aug 20, 2013 [retrieved on Aug. 24, 2012]. Retrieved from the Internet: <URL: http://en.wikipedia.org/wiki/Certificate_signing_request>, 4 pages.

Wikipedia, "Cryptographic hash function," Wikipedia [online] Aug 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug 8, 2012 [retrieved on Aug. 15, 2012]. Retrieved from the Internet: <URL: http://en.wikipedia.org/wiki/Public_Key_infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug 13, 2012 [retrieved on May 15, 2012]. Retrieved from the Internet: <URL: http://en.wikipedia.org/wiki/Two-factor_authentication>, 15 pages.

* cited by examiner

10:15 PM
Leasing Contract

The undersigned LESSOR/Landlord has let and demised unto the undersigned LESSEE(S) herein called "Tenant", this 5th day of October 2012.

Lessee/Tenant Name(s): Cindy Doe

Lessor/Landlord Name(s): John Doe

Rental Amount: $1000/month

Security Deposit: $500

Conditions: Animals allowed

Signed by
John Doe
Acme Company Employee

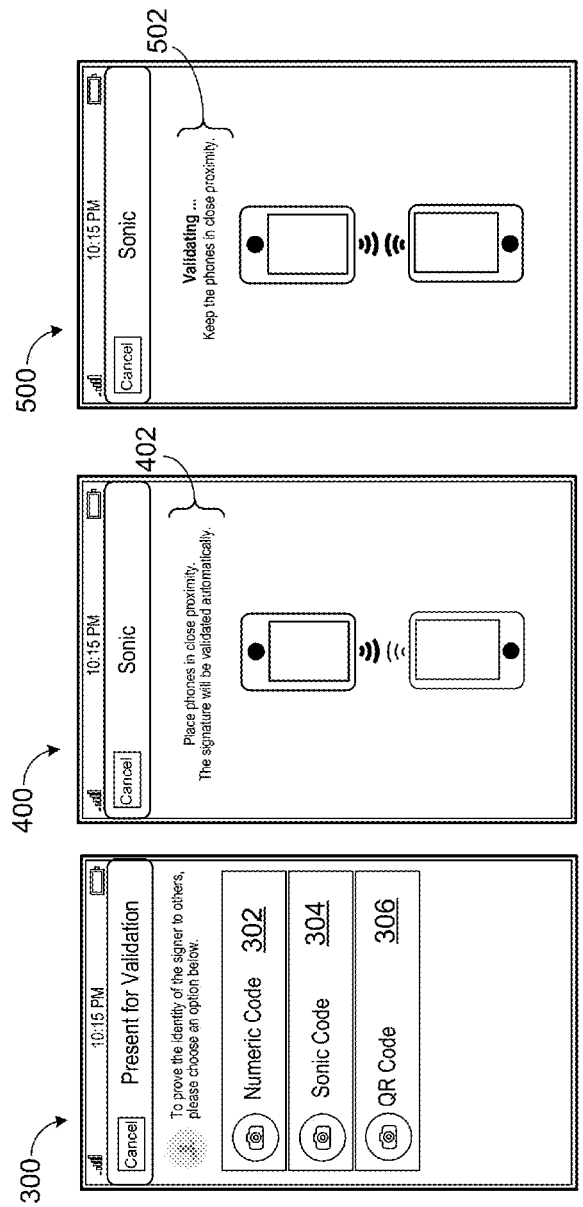

IDENTIFYING A SIGNER OF AN ELECTRONICALLY SIGNED ELECTRONIC RESOURCE

CROSS-REFERENCE TO RELATED APPLICATION

This application claims priority from U.S. Provisional Application No. 61/731,980, filed Nov. 30, 2012, and titled "Identifying a Signer of an Electronically Signed Electronic Resource," which is incorporated by reference in its entirety.

BACKGROUND

In one example, an electronic resource may be signed electronically by a user. An electronic resource may include an item of data that is accessible from a network and/or a computing device. There are various types of electronic resources, including, e.g., HTML pages, web pages, web sites, word processing documents, portable document format (PDF) documents, images, videos, audio files, electronic files, applications, and so forth.

SUMMARY

In one aspect of the present disclosure, a method performed by one or more processing devices comprises storing, at a server, an electronic resource that has been electronically signed by a user; associating the electronic resource with an identifier; receiving, at the server and from a client device, a request to identify the user who electronically signed the electronic resource, the request including a reference to the identifier; responsive to receiving the request to identify the user who electronically signed the electronic resource, identifying, based on the reference to the identifier, the electronic resource stored at the server; responsive to identifying the electronic resource stored at the server, identifying the user who electronically signed the identified electronic resource; and transmitting, from the server to the client device, an indication of an identity of the user who electronically signed the electronic resource.

Implementations of the disclosure can include one or more of the following features. In some implementations, the client device comprises a first client device, the user comprises a first user, and the method further comprises: enabling a second client device to access the electronic resource that has been electronically signed by the first user, wherein the second client device is used by a second user with whom the electronic resource is shared; wherein the second client device transmits, to the first client device, a representation of the identifier that is associated with the electronic resource; and wherein the first client device uses the representation of the identifier that is associated with the electronic resource in generating the request to identify the first user who electronically signed the electronic resource.

In other implementations, the representation of the identifier for the electronic resource comprises one or more of an alphanumeric representation, an ultrasonic audio signal representation, and an optical machine-readable representation. In still other implementations, the identifier for the electronic resource is usable a single time to validate the identity of the user who electronically signed the electronic resource.

In yet other implementations, the user comprises a first user, and transmitting, from the server to the client device, the indication of the identity of the first user who electronically signed the electronic resource comprises: transmitting, from the server to the client device, information specifying a name of the first user who electronically signed the electronic resource and information specifying a name of a second user who requested verification of the electronic signature applied to the electronic resource. In some implementations, the client device comprises a first client device and the user comprises a first user; a second client device generates the identifier and transmits the identifier to the server; and the second client device is used by a second user with whom the electronic resource is shared; and associating the electronic resource with the identifier comprises: associating the electronic resource with the identifier received from the second client device.

In other implementations, the client device comprises a first client device, the user comprises a first user, and the method further comprises: generating, at the server, the identifier that is associated with the electronic resource that has been electronically signed by the first user; and transmitting the identifier to a second client device, wherein the second client device is used by a second user with whom the electronic resource is shared; wherein associating the electronic resource with the identifier comprises: associating the electronic resource with the identifier generated at the server. In yet other implementations, identifying the user who electronically signed the identified electronic resource comprises: identifying, in a database, an association between information indicative of the identified electronic resource and signer information, wherein the signer information comprises information specifying the identity of the user who electronically signed the identified electronic resource.

In some implementations, the user comprises a first user, and the method further comprises: receiving, at the server, information specifying an identity of a second user who has electronically signed the electronic resource that is also electronically signed by the first user; wherein responsive to identifying the electronic resource stored at the server, identifying the first user who electronically signed the identified electronic resource comprises: responsive to identifying the electronic resource stored at the server, identifying the first user and the second user who electronically signed the identified electronic resource; and wherein transmitting, from the server to the client device, an indication of the identity of the first user who electronically signed the electronic resource comprises: transmitting, from the server to the client device, an indication of identities of the first user and the second user who electronically signed the electronic resource.

In still another aspect of the disclosure, one or more machine-readable media are configured to store instructions that are executable by a server to perform operations including storing, at the server, an electronic resource that has been electronically signed by a user; associating the electronic resource with an identifier; receiving, at the server and from a client device, a request to identify the user who electronically signed the electronic resource, the request including a reference to the identifier; responsive to receiving the request to identify the user who electronically signed the electronic resource, identifying, based on the reference to the identifier, the electronic resource stored at the server; responsive to identifying the electronic resource stored at the server, identifying the user who electronically signed the identified electronic resource; and transmitting, from the server to the client device, an indication of an identity of the user who electronically signed the electronic resource. Implementations of this aspect of the present disclosure can include one or more of the foregoing features.

In still another aspect of the disclosure, an electronic system includes a server; and one or more machine-readable media configured to store instructions that are executable by the server to perform operations including: storing, at the server, an electronic resource that has been electronically signed by a user; associating the electronic resource with an identifier; receiving, at the server and from a client device, a request to identify the user who electronically signed the electronic resource, the request including a reference to the identifier; responsive to receiving the request to identify the user who electronically signed the electronic resource, identifying, based on the reference to the identifier, the electronic resource stored at the server; responsive to identifying the electronic resource stored at the server, identifying the user who electronically signed the identified electronic resource; and transmitting, from the server to the client device, an indication of an identity of the user who electronically signed the electronic resource. Implementations of this aspect of the present disclosure can include one or more of the foregoing features.

In yet another aspect of the disclosure, one or more machine-readable media are configured to store instructions that are executable by one or more processing devices to perform operations comprising: receiving a representation of an identifier that references an electronic resource that has been electronically signed by a user, wherein the representation encodes the identifier that references the electronic resource that has been electronically signed by the user; decoding the representation of the identifier that references the electronic resource that has been electronically signed by the user; responsive to decoding the representation of the identifier that references the electronic resource that has been electronically signed by the user, transmitting a request to verify an identity of the user who electronically signed the electronic resource, the request including a reference to the identifier; responsive to transmitting the request to verify the identity of the user who electronically signed the electronic resource, receiving an indication of the identity of the user who electronically signed the electronic resource; and rendering, on a display device, a visualization of the indication of the identity of the user who electronically signed the electronic resource to enable a user of the one or more processing devices to verify the identity of the user who electronically signed the electronic resource, wherein the display device is configured for communication with the one or more processing devices.

Implementations of the disclosure can include one or more of the following features. In some implementations, the representation of the identifier for the electronic resource comprises one or more of an alphanumeric representation, an ultrasonic audio signal representation, and an optical machine-readable representation. In other implementations, the identifier for the electronic resource is usable a single time to validate the identity of the user who electronically signed the electronic resource. In still other implementations, decoding the representation of the identifier that references the electronic resource that has been electronically signed by the user comprises: decoding the representation of the identifier that references the electronic resource that has been electronically signed by the user to extract the identifier that is encoded in the representation.

In yet some implementations, receiving the indication of the identity of the user who electronically signed the electronic resource comprises: receiving information specifying a name of the user who electronically signed the electronic resource and information specifying a name of a user who requested verification of the electronic signature applied to the electronic resource. In some implementations, a first user and a second user both electronically signed the electronic resource, and wherein receiving the indication of the identity of the user who electronically signed the electronic resource comprises: receiving an indication of the identity of the first user who electronically signed the electronic resource and an indication of an identity of the second user who also electronically signed the electronic resource.

All or part of the foregoing can be implemented as a computer program product including instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF THE DRAWINGS

FIGS. 1-8 illustrate examples of graphical user interfaces for an example of an application that enables third party verification of an electronically signed electronic resource.

DETAILED DESCRIPTION

A system consistent with this disclosure implements an application (e.g., a mobile identity management application) for providing a user of the application with a mechanism that enables the user to electronically sign an electronic resource, e.g., by inputting an electronic signature of the user into a signature field of the electronic resource or by otherwise associating an electronic signature of the user with the electronic resource. In this example, the user who electronically signs the electronic resource is a signer. The signer may share the electronically-signed electronic resource with one or more recipients. Generally, a recipient includes a user with whom an electronic resource is shared. A recipient of the shared electronic resource may use a computing device to display the shared electronic resource to a third party, e.g., a verifier. Generally, a verifier includes a user of the application who desires to verify an identity of a signer who has electronically signed an electronic resource. The application may provider the verifier with options that enable the verifier to confirm that the shared electronic resource was electronically signed by the signer.

For example, the electronic resource may be associated with an identifier, e.g., a unique code that references the electronic resource. When the identifier is received by the verifier's computing device, the verifier's computing device may use the identifier to confirm an identity of a signer who electronically signed an electronic resource.

Figure 1:
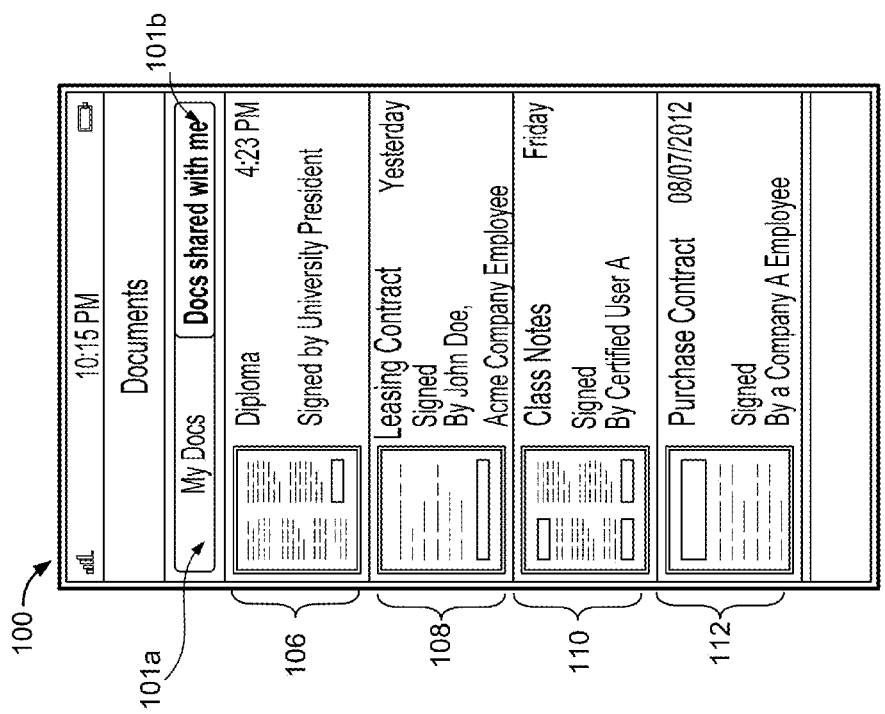

Referring to FIG. 1, a computing device (not shown) displays graphical user interface 100 for a user (not shown). In this example, the user is a recipient of a shared electronic resource. In the example of FIG. 1, the computing device implements an application (not shown) for displaying electronic resources that are available to the user within the application. In this example, graphical user interface 100 is one of the graphical user interfaces rendered by the application.

In the example of FIG. 1, some of the electronic resources may be owned by the user, while some other electronic resources may be owned by other entities, but shared with the user. Based on a selection of one of control 101a or control 101b, graphical user interface 100 can switch between views that show the list of electronic resources owned by the user and the list of electronic resources shared with the user, respectively. In the example of FIG. 1, control 101b is selected, such that graphical user interface 100 displays indicators 106, 108, 110, 112 of electronic resources that are shared with the user. In this example, the user is a recipient of the electronic resources represented by indicators 106, 108, 110, 112. In this example, an electronic resource (e.g., electronic resource 202 in FIG. 2) is associated with indicator 108.

Referring to FIG. 2, graphical user interface 200 is displayed on a computing device (not shown), e.g., following selection of the portion of graphical user interface 100 associated with indicator 108. Graphical user interface 200 displays a visual representation of electronic resource 202 that has been shared with a recipient (not shown) who is using the computing device that renders graphical user interface 200. In this example, electronic resource 202 is the electronic resource represented by indicator 108 (FIG. 1).

In the example of FIG. 2, resource 202 includes a signature indication 208. In this example, a signer (not shown) has electronically signed electronic resource 202. Consequently, signature indication 208 is displayed, for example, to indicate that electronic resource 202 has been electronically signed by a user and/or to identify the user who electronically signed electronic resource 202. The electronic signature may be based on a public key infrastructure (PKI), for example, and/or on the Electronic Signature Algorithm (DSA). In some implementations, the application may enable users of the application to manage multiple different electronic credentials, and the signer may be able to select a particular electronic credential from among multiple different electronic credentials of the signer to use to electronically sign electronic resource 202. In such implementations, information about the signer stored in connection with the selected credential may be used to populate signature indication 208. For example, the signer may have selected an employee ID credential to use to electronically sign electronic resource 202, and information about the signer stored in connection with the selected credential may reflect that the signer is named John Doe and is an employee of the Acme Company. Consequently, in this example, the signature indication 208 displays the name of the signer and information specifying that the signer is an employee of the Acme Company. Graphical user interface 200 also includes control 204 that, when selected, causes various mechanisms for enabling a verifier to confirm the identity of the signer who electronically signed electronic resource 202 to be enabled.

In an example, electronic resource 202 is a leasing contract between a landlord and a tenant. In this example, the signer (e.g., John Doe) of electronic resource 202 is the landlord. The recipient with whom electronic resource 202 is shared is a tenant named Cindy Doe. In this example, the tenant wants to adopt an animal from an animal shelter. As shown in FIG. 2, the leasing contract specifies that animals are allowed on the leased premises. However, before the animal shelter will allow the tenant to adopt an animal, the tenant must prove to the shelter that the tenant's landlord allows animals on the premises that are being leased by the tenant.

The tenant may prove this to the animal shelter by enabling the animal shelter to confirm that the landlord did in fact sign the leasing contract, which explicitly allows animals. In this example, the animal shelter is a verifier of the authenticity of the electronic signature applied to electronic resource 202. As described below, the animal shelter is provided with options that enable the animal shelter to confirm that shared electronic resource 202 was electronically signed by the signer (e.g., the landlord).

Referring to FIG. 3, graphical user interface 300 displays various mechanisms for confirming (e.g., with a verifier) the identity of the signer who electronically signed an electronic resource (e.g., electronic resource 202 in FIG. 2). In this example, graphical user interface 300 is displayed on computing device used by a recipient with whom electronic resource 202 is shared. The recipient may be the tenant in the above example. In this example, graphical user interface 300 is displayed following selection of control 204 (FIG. 2).

In the example of FIG. 3, graphical user interface 300 includes controls 302, 304, 306 for causing a representation of the identifier for electronic resource 202 to be transmitted to a verifier's computing device and/or presented to the verifier. Generally, a representation of the identifier may include an alphanumeric code, a visualization and/or an audio signal that is generated at least partly based on the identifier. In this example, the representation encodes the identifier.

Upon selection of control 302, the recipient selects to use an alphanumeric code to prove the integrity of the electronic signature reflected in signature indicator 208 of electronic resource 202 to a verifier. Generally, an alphanumeric code includes a sequence of one or more of numbers, letters, and/or non-numeric symbols. In an example, an alphanumeric code includes one or more of a string of letters, a string of numbers, and a string of letters and non-numeric symbols, or any combination thereof.

Upon selection of control 304, the recipient selects to use an ultrasonic audio signal to prove the integrity of the electronic signature reflected in signature indicator 208 of electronic resource 202 to a verifier. Upon selection of control 306, the recipient selects to use a Quick Response (QR) code to prove the integrity of the electronic signature reflected in signature indicator 208 of electronic resource 202 to a verifier. Following selection of one of controls 302, 304, 306, a computing device (e.g., the recipient's computing device that is displaying graphical user interface 300) generates an alphanumeric code, an ultrasonic audio signal or a QR code for output by the recipient's computing device to the verifier's computing device.

In an example, the recipient selects control 304, e.g., to choose to use ultrasonic audio signals to prove the integrity of the electronic signature reflected in signature indicator 208 of electronic resource 202 to a verifier. In this example, the identifier is encoded in the ultrasonic audio signals. Following selection of control 304, the recipient's computing device displays graphical user interface 400 (FIG. 4) and then graphical user interface 500 (FIG. 5).

Referring to FIG. 4, graphical user interface 400 displays notification message 402, e.g., on a recipient's computing device after the recipient has chosen to use ultrasonic audio signals to confirm the identity of the signer of electronic resource 202. In this example, notification message 402 instructs the recipient to place the recipient's computing device in proximity (e.g., geographic closeness) to the verifier's computing device, e.g., to enable the recipient's computing device to transfer an ultrasonic audio signal to the verifier's computing device.

Referring to FIG. 5, graphical user interface 500 displays notification message 502 on the computing device used by the recipient. In this example, notification message 502 notifies the recipient that the identity of the signer of electronic resource 202 is being validated for the verifier, e.g., based on the transmitted ultrasonic audio signal.

Referring back to FIG. 3, a recipient may select control 306, e.g., to choose to use a QR code to verify the identity of the signer of electronic resource 202. In this example, the recipient's computing device generates a QR code to confirm the identity of a signer of the shared electronic resource (e.g., electronic resource 202). Following selection of control 306, the recipient's computing device displays graphical user interface 600 (FIG. 6).

Figures 6, 7:
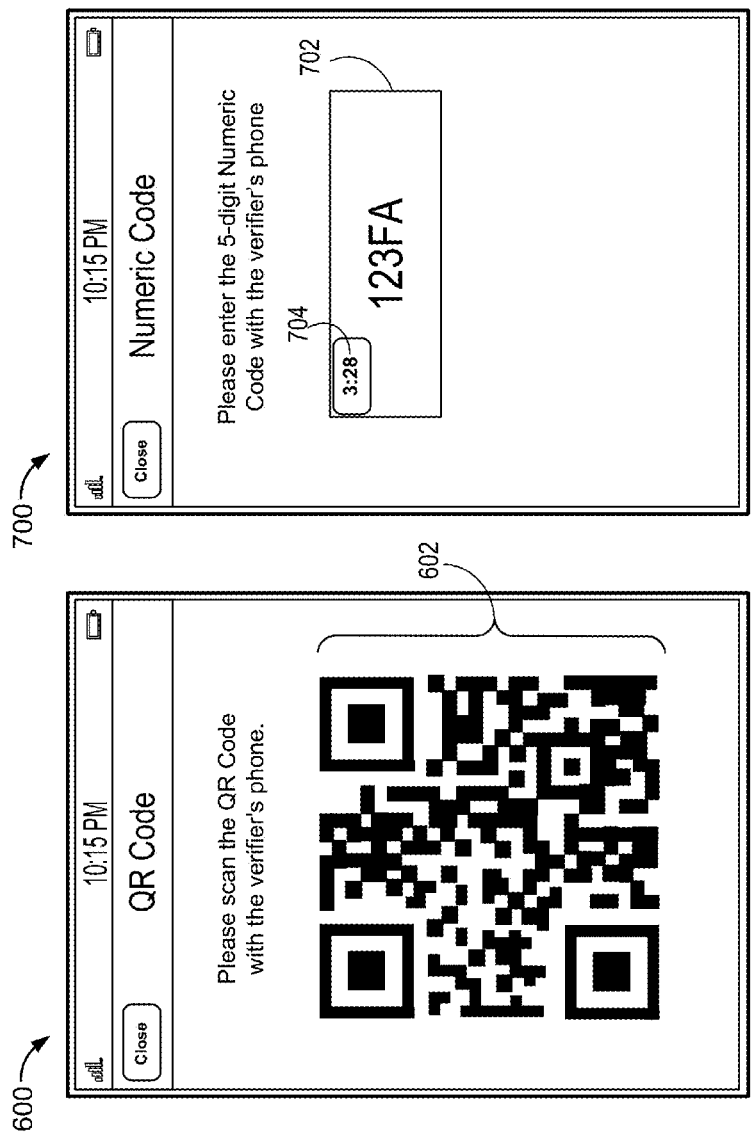

Referring to FIG. 6, graphical user interface 600 displays QR code 602. In this example, QR code 602 encodes the identifier for the shared electronic resource (e.g., electronic resource 202). In an example, QR code 602 may be generated by the recipient's computing device. The recipient's computing device displays QR code 602, e.g., to enable the verifier's computing device to scan QR code 602 into the verifier's computing device.

Referring back to FIG. 3, a recipient may select control 302, e.g., to choose to use an alphanumeric code to verify the identity of the signer of electronic resource 202. Following selection of control 302, the recipient's computing device displays graphical user interface 700 (FIG. 7).

Referring to FIG. 7, graphical user interface 700 displays alphanumeric code 702. In this example, alphanumeric code 702 may be generated by the recipient's computing device. In another example, alphanumeric code 702 may be generated by a server in communication with the recipient's computing device. In this example, the server transmits alphanumeric code 702 to the recipient's computing device.

The recipient's computing device displays alphanumeric code 702, e.g., to enable the verifier to view alphanumeric code 702 and to enter alphanumeric code into the verifier's computing device. In another example, the recipient may speak alphanumeric code 702 to the verifier.

In an example, the alphanumeric code is periodically refreshed, e.g., periodically re-generated by the recipient's computing device or the server. The periodic generation of new alphanumeric codes may be a security mechanism that decreases a likelihood of a malicious user gaining access to a particular alphanumeric code, relative to the likelihood of a malicious user gaining access to the particular alphanumeric code in an absence of the periodic generation of new alphanumeric codes. In the example of FIG. 7, graphical user interface 700 includes portion 704, e.g., for display of a clock indicative of an amount of time that remains until the alphanumeric code is refreshed.

In an example, the verifier's computing device receives the representation of the identifier. As described above, there are various different types of representations, including, e.g., an alphanumeric code, a QR code and/or an ultrasonic audio signal. Based on the type of representation, the verifier's computing device may need to decode the representation to obtain the identifier. In other examples, the verifier's computing device may not need to decode the representation, e.g., when the identifier is part of an alphanumeric representation.

In an example, the representation of the identifier includes one or more of a QR code or an ultrasonic audio signal. In this example, the verifier's computing device decodes the representation, e.g., to obtain the identifier and/or a reference to the identifier. For example, the verifier's computing device may decode the representation into a string that includes the identifier. Using the identifier, the verifier's computing device generates a query for confirmation of the identity of the signer of the electronic resource.

In another example, the representation of the identifier includes an alphanumeric code. In this example, rather than decoding the representation, the verifier's computing device may transmit the alphanumeric code to a server for use in confirming the identity of the signer of the electronic resource. In this example, the alphanumeric code may be transmitted by being included in a query that requests confirmation of the identity of the signer of the electronic resource.

As described above, using the identifier (e.g., whether obtained through decoding a QR code and/or an ultrasonic audio signal or through an alphanumeric code), the verifier's computing device generates a query that includes the identifier and/or the reference to the identifier. The verifier's computing device passes the query to a server. In response, the server identifies a shared electronic resource that is associated with the identifier and determines an identity of a user who electronically signed the electronic resource, including, e.g., electronic resource 202.

In response to identifying a user who has electronically signed the electronic resource, the server transmits an indication of the identity of the user who has electronically signed the electronic resource to the verifier's computing device, thereby enabling the verifier to verify the electronic signature applied to the electronic resource. In implementations in which the signer used a particular electronic credential of the signer to electronically sign the electronic resource, information included within the indication of the identity of the user who electronically signed the electronic resource transmitted to the verifier's computing device may be drawn from information stored in connection with the electronic credential that the user used to electronically sign the electronic resource.

Figure 8:
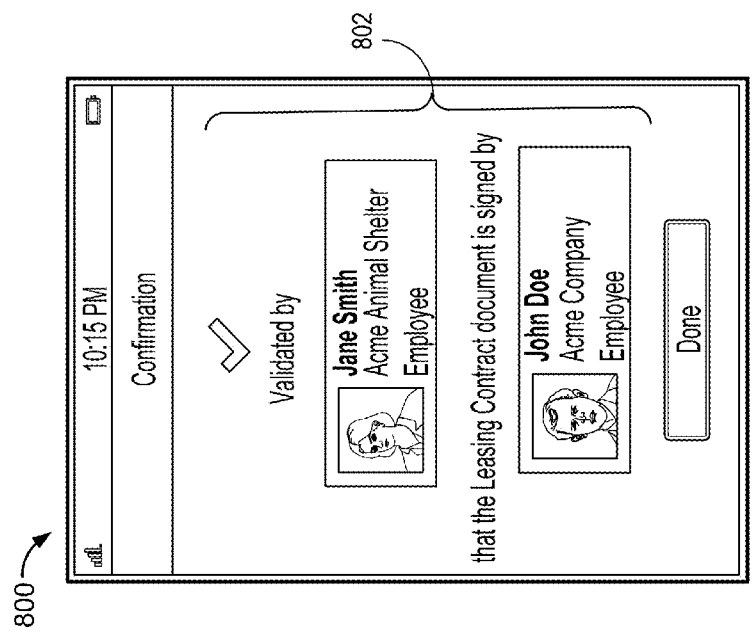

Referring to FIG. 8, the verifier's computing device (not shown) displays graphical user interface 800. In this example, graphical user interface 800 displays notification message 802, which notifies the verifier that the identity of the signer who electronically signed the electronic resource has been confirmed. In this example, notification message 802 may be generated by the verifier's computing device.

In another example, a server that is in communication with the verifier's computing device sends, to the verifier's computing device, an indication of an identity of the user who electronically signed the electronic resource. Using the received indication, the verifier's computing device generates notification message 802. In another example, the server generates notification message 802, e.g., following verification of the user who electronically signed the electronic resource. In this example, the server transmits notification message 802 to the verifier's computing device.

Notification message 802 displays a name (e.g., Jane Smith) and a corporate affiliation (e.g., Acme Animal Shelter Employee) of the verifier. Notification message 802 also displays information confirming an identity of the user who signed the electronic resource. In the example of FIG. 8, notification message 802 displays information specifying a name (e.g., John Doe) and further identifying information (e.g., information specifying that John Doe is an employee of a company named the Acme Company) of the signer of the electronic resource. Referring to the above example of the animal shelter, notification message 802 provides an employee (e.g., Jane Smith) of the animal shelter with confirmation that the landlord (e.g., John Doe) has signed electronic resource 202 (FIG. 2), which allows tenants to have animals on the leased premises.

Figure 9:
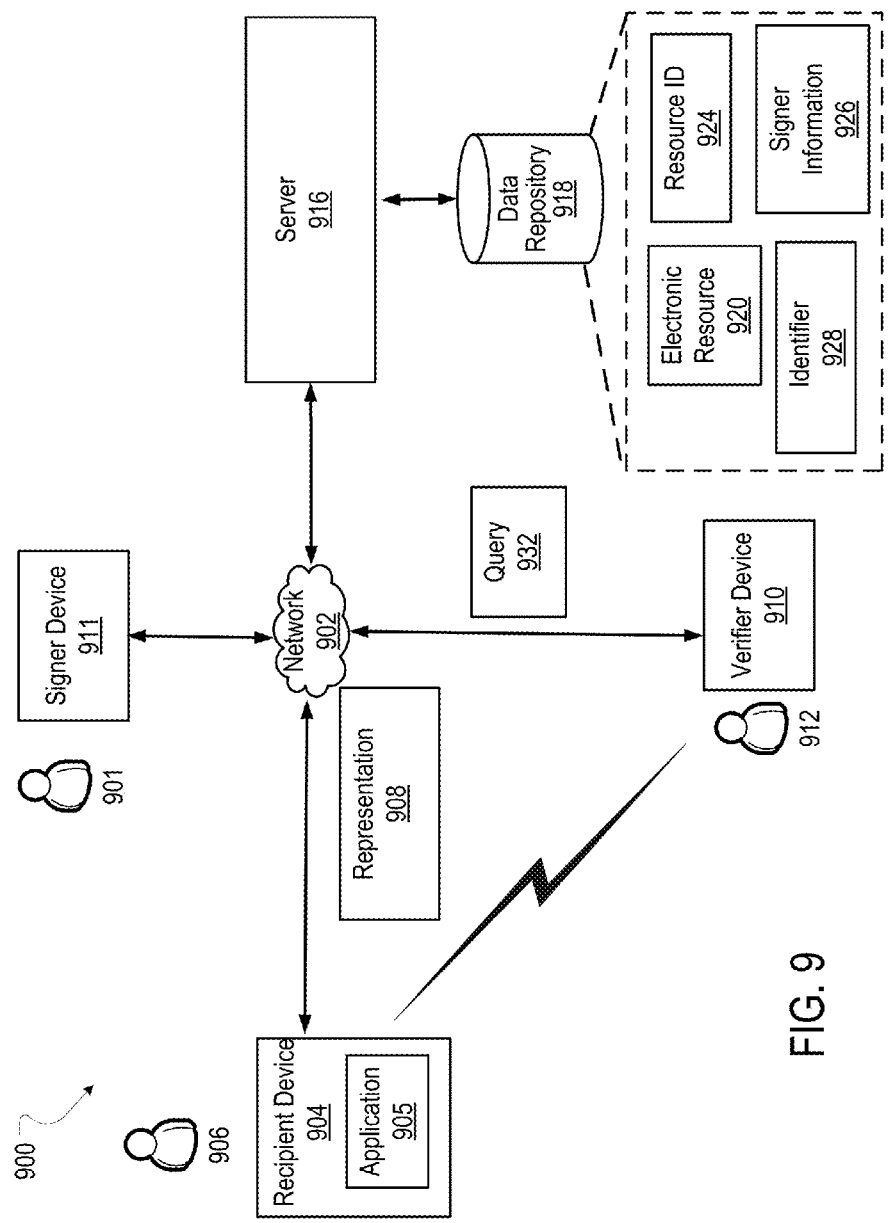
FIG. 9 is a block diagram of an example of a network environment that enables third party verification of an electronically signed electronic resource.

FIG. 9 is a block diagram of an example of a network environment 900 that enables third party verification of an electronically signed electronic resource. Network environment 900 includes network 902, client devices 904, 910, 911, server 916, and data repository 918. Network environment 900 may include many thousands of data repositories, client devices, and servers, which are not shown.

In the example of FIG. 9, client device 911 is associated with user 901. In this example, user 901 is a signer of electronic resource 920. Hereinafter, user 901 may be referred to as signer 901 and client device 911 may be referred to as signer device 911, for purposes of convenience, and without limitation.

In the example of FIG. 9, client device 904 is associated with user 906. In this example, user 906 is a recipient of a shared electronic resource, e.g., electronic resource 920 that is shared with user 906 by signer 901. Hereinafter, user 906 may be referred to as recipient 906 and client device 904 may be referred to as recipient device 904, for purposes of convenience, and without limitation. In this example, client device 904 executes application 905, e.g., a mobile identity management application. Generally, an application includes a computer program with a graphical user interface. In this example, a mobile identity management application includes an application that allows a user to confirm an identity of a signer of an electronic resource that has been shared with another user (e.g., by the signer).

Client device 910 is associated with user 912. In this example, user 912 is a verifier, e.g., of an identity of a user who electronically signed electronic resource 920. Hereinafter, user 912 may be referred to as verifier 912 and client device 910 may be referred to as verifier device 910, for purposes of convenience, and without limitation.

In the example of FIG. 9, signer 901 uses signer device 911 to upload electronic resource 920 to server 916. In an example, signer device 911 uploads electronic resource 920 using a secure socket layer (SSL) or some other secure transfer mechanism. Upon receipt of electronic resource 920, server 916 generates resource identifier (ID) 924 for electronic resource 920. Generally, a resource ID may include information that uniquely identifies an electronic resource. For example, resource ID 924 may include an alphanumeric string that uniquely identifies electronic resource 920. Server 916 generates, in data repository 918, an association between electronic resource 920 and resource ID 924. In this example, the association includes a pointer, e.g., a data structure that causes one item of data to reference another item of data.

Signer 901 may use signer device 911 to electronically sign electronic resource 920, e.g., by inputting an electronic signature into electronic resource 920 or by otherwise associating an electronic signature with electronic resource 920. In an example, signer 901 may electronically sign electronic resource 920 after electronic resource 920 has been uploaded to server 916. In another example, signer 901 may electronically sign electronic resource 920 prior to uploading electronic resource 920 to server 916. Following detection of application of an electronic signature to electronic resource 920, server 916 generates signer information 926. Generally, signer information 926 includes information specifying an identity of a user who electronically signed an electronic resource. For example, signer information 926 may include information specifying a name of signer 901 of electronic resource 920, information specifying a title of signer 901 of electronic resource 920, information specifying that signer 901 is a party in a transaction that is documented by electronic resource 920, and so forth. In an example, server 916 generates signer information 926 by extracting information stored in connection with an electronic credential of the signer selected by the signer to be used to electronically sign electronic resource 920. In this example, the electronic signature may include information specifying a name of signer 901 of electronic resource 920, information specifying a title of signer 901 of electronic resource 920, and so forth.

Data repository 918 also stores signer information 926. In this example, server 916 generates, in data repository 918, an association between signer information 926 and one or more of electronic resource 920 and resource ID 924, e.g., to specify that electronic resource 920 is signed by a user specified by signer information 926.

In an example, signer 901 shares electronic resource 920 with recipient 906. There are various ways in which signer 901 may share electronic resource 920 with recipient 906, including, e.g., transmitting a request to server 916 to send electronic resource 920 to recipient device 904, causing recipient device 904 to receive a code that may be used to retrieve electronic resource 920 from data repository 918, and so forth.

In an example, recipient device 904 receives or otherwise accesses electronic resource 920 that is shared with recipient 906. In this example, recipient 906 transmits, to server 916, information indicative of a desire of another user to verify the electronic signature applied to electronic resource 920. In response, server 916 generates (or retrieves) identifier 928 for electronic resource 920. In this example, identifier 928 includes a unique code (e.g., an alphanumeric string) that references electronic resource 920. For example, identifier 928 may include and/or be based on various types of information, including, e.g., resource ID 924, numbers specifying a time at which identifier 918 is generated, randomly generated numbers, and so forth. In an example, identifier 928 and resource ID 924 may have the same values.

In this example, server 916 associates identifier 928 with electronic resource 920 for which recipient 906 has indicated another user desires to verify the electronic signature. In an example, server 916 associates identifier 928 with electronic resource 920 by generating an association among identifier 928 and one of resource ID 924 and electronic resource 920. In this example, following generation of identifier 928 by server 916, server 916 transmits identifier 928 to recipient device 904, e.g., to enable recipient device 904 to generate representation 908 of identifier 928. In a variation of FIG. 9, recipient device 904 may generate identifier 928 and may transmit identifier 928 to server 916 for association with electronic resource 920 and/or with resource ID 924.

In the example of FIG. 9, recipient device 904 generates representation 908 of identifier 928. Recipient device 904 may generate various different types of representations of identifier 928, including, e.g., an alphanumeric representation, an audio signal representation, an optical machine-readable representation (e.g., a QR code, a bar code, and so forth).

In an example, recipient device 904 may generate an optical machine-readable representation for identifier 928. An optical machine-readable representation may be an arrangement of graphical elements that encode alphanumeric data, where the elements are arranged so that the data can be read by an optical scanner. For example, an optical machine-readable representation may be a bar code or a QR code. In this example, verifier 912 uses a scanner (e.g., a camera) on verifier device 910 to scan (e.g., photograph) the optical machine-readable representation into verifier device 910.

In the example of FIG. 9, recipient device 904 implements numerous techniques in generating optical machine-readable representations. In an example, recipient device 904 maps seed values (e.g., identifier 928) to a set of alphanumeric characters, e.g., using various techniques. For example, the characters in identifier 928 could be concatenated, manipulated using mathematical functions, encrypted using a cryptographic algorithm such as AES, hashed using a hash function such as MD5, SHA-1 or SHA-2, subsampled to select a predetermined subset or subsets, or any combination of these techniques to generate a suitable set of alphanumeric characters. Once the set of alphanumeric characters has been generated, recipient device 904 encodes the set of alphanumeric characters to generate an optical-machine readable representation, e.g., using various techniques. For example, recipient device 904 may call a function or library routine that encodes QR codes in accordance with the QR code International Organization for Standardization (ISO) standard, ISO/IEC 18004:2006 RSS, Information technology—Automatic identification and data capture techniques—QR Code 2005 bar code symbology specification. Recipient device 904 can store the optical machine-readable representation in a suitable memory.

In another example, rather than encoding the generated set of alphanumeric characters into an optical-machine readable representation, recipient device 904 may transmit, to verifier device 910, the generated set of alphanumeric characters in several other ways. For example, recipient device 904 could output an audio signal from a speaker corresponding to the contents (e.g., the symbols, letters, and/or numeric values) of the generated set of alphanumeric characters that would be received by verifier device 910. This audio signal could be a human perceptible audible signal (e.g., a signal with frequency ranging from 20 Hz to 20 kHz), or it could be an ultrasonic signal (e.g., a signal with frequency that exceeds 20 kHz) that is detectable by a microphone on verifier device 910. In such implementations, the set of alphanumeric characters may be encoded within the audio signal such that even if the audio signal is audible the characters of the set of alphanumeric characters themselves may not be discernible. As another example, recipient device 904 may transmit the generated set of alphanumeric characters to verifier device 910 using electronic radio-frequency communications, e.g., near-field communications (NFC) or Bluetooth. In still another example, recipient 906 could speak the contents of the generated set of alphanumeric characters to verifier 912.

In a variation of FIG. 9, the seed values and/or the set of alphanumeric characters that are used in generating representation 908 may be generated by server 916, using the techniques described herein. In this example, server 916 transmits, to recipient device 904, the seed values and/or the set of alphanumeric characters that are generated by server 916.

In an example, recipient device 904 generates an alphanumeric representation of identifier 928. Generally, an alphanumeric representation includes an alphanumeric code that encodes identifier 928. In an example, recipient device 904 may implement various techniques in generating the alphanumeric representation of identifier 928. In one example, recipient device 904 may use a random number generator or pseudo-random number generator provided by a function or library routines that are accessible to recipient device 904. A pseudo-random number generator may use identifier 928 and/or a clock at recipient device 904 as a seed, which may provide suitable randomness for some applications.

In a variation of FIG. 9, the alphanumeric representation may be generated by server 916, using the techniques described herein. In this example, server 916 transmits, to recipient device 904, the alphanumeric representation that is generated by server 916.

An alphanumeric representation can be transmitted from recipient device 904 to verifier device 910 in several ways. For example, recipient device 904 could output an audio signal from a speaker corresponding to the contents (e.g., symbols, letters, and/or numeric values) of the alphanumeric representation that would be received by verifier device 910. This audio signal could be a human perceptible audible signal (e.g., a signal with frequency ranging from 20 Hz to 20 kHz), or it could be an ultrasonic signal (e.g., a signal with frequency that exceeds 20 kHz) that is detectable by a microphone on verifier device 910. As another example, recipient device 904 may transmit the numeric representation to verifier device 910 using electronic radio-frequency communications, e.g., NFC or Bluetooth. In still another example, recipient 906 could speak the contents of the alphanumeric representation to verifier 912.

In still another example, recipient device 904 generates audio signals that represent identifier 928, e.g., by having identifier 928 encoded in the audio signals. In operation, recipient device 904 can use seed values (e.g., identifier 928, time, and so forth) to generate the audio signals. The time can be a current timestamp (e.g., time in seconds or milliseconds) obtained from a timing device such as a hardware or software clock located at recipient device 904. In some examples, the timing device can be synchronized with server 916, and/or with one or more additional servers that provide a master clock reference as described below. Additional seed values may be used, such as randomly generated numbers.

The seed values can be concatenated, manipulated using mathematical functions, hashed using a hash function such as MD5, SHA-1 or SHA-2, subsampled to select a predetermined subset or subsets, or any combination of these techniques. Recipient device 904 converts the seed values to corresponding audio signals, e.g., through use of a data to signal converter (e.g., a radio frequency transmission unit). In a variation of FIG. 9, the seed values and/or the predetermined subset(s) may be generated by server 916, using the techniques described herein. In this example, server 916 transmits, to recipient device 904, the seed values and/or the predetermined subset(s) that are generated by server 916.

The generated audio signal could be a human perceptible audible signal (e.g., a signal with frequency ranging from 20 Hz to 20 kHz), or it could be an ultrasonic audio signal (e.g., a signal with frequency that exceeds 20 kHz) that is detectable by a microphone on verifier device 910. As another example, recipient device 904 may transmit the audio signal to verifier device 910 using electronic radio-frequency communications, e.g., NFC or Bluetooth.

In the example of FIG. 9, recipient 906 uses recipient device 904 to transfer representation 908 to verifier device 910. After receipt of representation 908, verifier device 910 decodes representation 908, e.g., to extract identifier 928 (and/or a reference to identifier 928), which is encoded in representation 908. In this example, verifier device 910 may use functions and/or library routines that are accessible to verifier device 910 to decode representation 908.

Using identifier 928, verifier device 910 generates query 932, including, e.g., a request for confirmation of the identity of signer 901 who electronically signed electronic resource 920. In the example of FIG. 9, query 932 includes a reference to identifier 928 and/or identifier 928. By transmitting query 932 to server 916, verifier device 910 queries server 916 to identify the user who signed electronic resource 920.

In response to receipt of query 932, server 916 extracts (or otherwise derives) identifier 928 from query 932. Server 916 determines an electronic resource and/or a resource ID that is associated with identifier 928. In the example of FIG. 9, server 916 identifies that resource ID 924 is associated with identifier 928. Using resource ID 924, server 916 identifies that electronic resource 920 is associated with resource ID 924. Based on the association between resource 920 and resource ID 924, server 916 determines that verifier 912 is requesting verification of the user who electronically signed electronic resource 920. In response, server 916 determines that signer information 926 is associated with electronic resource 920 and/or with resource ID 924 for electronic resource 920. Server 916 uses signer information 926 to identify the user who electronically signed electronic resource 920. In the example of FIG. 9, server 916 uses signer information 926 to identify that signer 901 electronically signed electronic resource 920. Server 916 transmits an indication of the identity of signer 901 to verifier device 910, e.g., to prove the identity of the user who signed electronic resource 920 to verifier 912. In this example, the indication of the identity of signer 901 includes information specifying a name of signer 901 and/or information specifying a title of signer 901.

In an example, identifier 928 and/or representation 908 may be valid for only a single use. In this example, after identifier 928 and/or representation 908 is used to verify signer 901, server 916 and/or recipient device 904 invalidates identifier 928 and/or representation 908 and identifier 928 and/or representation 908 no longer can be used to verify another signer of electronic resource 920. If recipient 906 desires to verify the identity of signer 901 of electronic resource 920 to another user, server 916 or recipient device 904 generates a new identifier and/or representation for electronic resource 920.

In an example, after recipient device 904 transmits and/or presents representation 908 of identifier 928 to verifier device 910, server 916 and/or recipient device 904 invalidates identifier 928, e.g., irrespective of whether identifier 928 is used to verify the identity of signer 901 of electronic resource 920.

In an example, a signer (e.g., signer 901) is a physician. A recipient (e.g., recipient 906) is a patient of the physician. A verifier (e.g., verifier 912) is a pharmacist at a pharmacy where the patient desires to fill a prescription written by the physician. In this example, the physician writes and electronically signs the prescription on the physician's computing device. In this example, the physician uses the physician's computing device to transfer the electronically signed prescription to a server, e.g., along with a request that the server transfer the electronically signed prescription to the computing device used by the patient. In this example, the request to transfer may include a user ID of the patient with the application, e.g., to enable the server 916 to deliver the electronically signed prescription to the patient within the application, and/or the request to transfer may include an electronic mail address of the patient, e.g., to enable the server 916 to email the electronically signed prescription to the patient.

Following receipt of the electronically signed prescription, the server generates a resource ID for the electronically signed prescription, generates signer information for the electronically signed prescription, and generates an identifier for the electronically signed prescription, e.g., using the techniques described herein. In an example, the server transmits to the patient's computing device the electronically signed prescription, along with the identifier for the electronically signed prescription.

In an example, the patient may use the patient's computing device to show the prescription to a pharmacist in order to have the prescription filled. In this example, the pharmacist may want to verify that the prescription was, in fact, written and electronically signed by the physician, e.g., before filling the prescription for the patient. In this example, the patient's computing device generates a representation of the identifier for the electronically signed prescription. The patient's computing device transmits and/or presents the representation to the pharmacist's computing device. The pharmacist's computing device decodes the representation. Using the decoded representation, the pharmacist's computing device generates a request for confirmation of the identity of the physician who electronically signed the prescription. The pharmacist's computing device sends the request to the server. In this example, the request includes the identifier (and/or a reference to the identifier) for the electronically signed prescription.

Using the identifier included in the request, the server identifies signer information for the electronically signed prescription. Using the signer information, the server transmits to the pharmacist's computing device a message confirming the identity of the physician who electronically signed the prescription. After the pharmacist successfully verifies that the prescription script was signed by the physician, the pharmacist may fill the prescription for the patient.

In a variation of FIG. 9, electronic resource 920 is electronically signed by signer 901 and by a second signer (not shown). For example, a client device (not shown) used by the second signer may transmit, to server 916, information specifying that the second signer has electronically signed electronic resource 920. In this example, server 916 may update contents of signer information 926 with information specifying an identity of the second signer, including, e.g., a name of the second signer and a title of the second signer.

In this example, signer information 926 includes information that identifies signer 901 and information that identifies the second signer. For example, signer information 926 may include information specifying a name and a title of signer 901 and information specifying a name and a title of the second signer. Using contents of signer information 926, server 916 determines that signer 901 and the second signer both electronically signed electronic resource 920. In this example, server 916 transmits, to verifier device 910, information specifying a name of signer 901 who electronically signed electronic resource 920 and information specifying a name of the second signer who also electronically signed electronic resource 920. In this example, verifier 910 uses the transmitted information to confirm that signer 901 and the second signer both applied electronic signatures to electronic resource 920.

Figure 10:
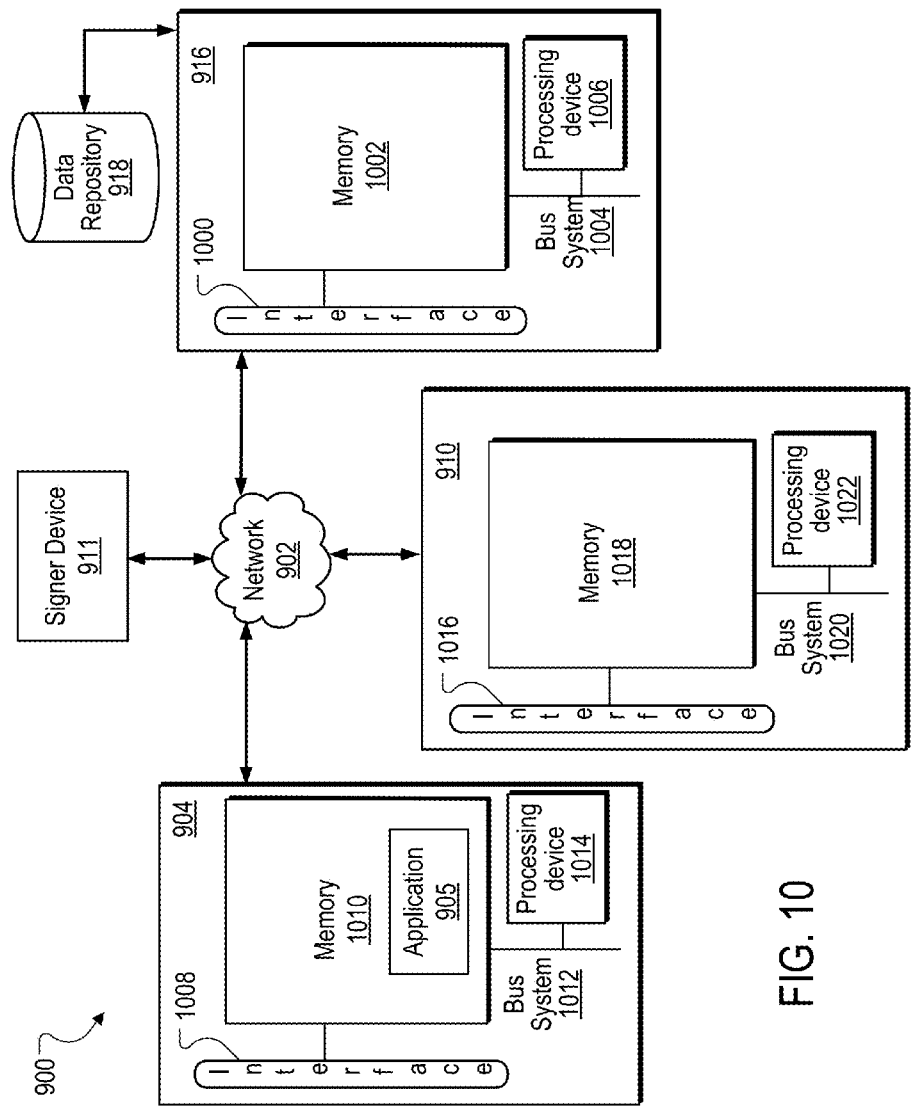
FIG. 10 is a block diagram showing examples of components of a network environment that enables third party verification of an electronically signed electronic resource.

FIG. 10 is a block diagram showing examples of components of network environment 900 that enables third party verification of an electronically signed electronic resource. Server 916 can be a variety of computing devices capable of receiving data and running one or more services, including, e.g., an application, which can be accessed by client devices 904, 910, 911. In an example, server 916 can include a distributed computing system, a desktop computer, a laptop, a cell phone, a rack-mounted server, and the like. Server 916 can be a single server or a group of servers that are at the same position or at different positions. Server 916 and each of client devices 904, 910, 911 can execute programs having a client-server relationship to each other. Although distinct modules are shown in FIG. 10, in some examples, client and server programs can execute on the same device.

Server 916 can receive data from client devices 904, 910, 911 through input/output (I/O) interface 1000. I/O interface 1000 can be a type of interface capable of receiving data over a network, including, e.g., an Ethernet interface, a wireless networking interface, a fiber-optic networking interface, a modem, and so forth. Server 916 also includes a processing device 1006 and memory 1002. A bus system 1004, including, for example, a data bus and a motherboard, can be used to establish and to control data communication between the components of server 916.

Processing device 1006 can include one or more microprocessors. Generally, processing device 1006 can include an appropriate processor and/or logic that is capable of receiving and storing data, and of communicating over a network (e.g., network 902). Memory 1002 can include a hard drive and a random access memory storage device, including, e.g., a dynamic random access memory, or other types of non-transitory machine-readable storage devices. As shown in FIG. 10, memory 1002 stores computer programs that are executable by processing device 1006. These computer programs may include an application for implementing the operations and/or the techniques described herein. The application can be implemented in software running on a computer device (e.g., server 916), hardware or a combination of software and hardware.

In the example of FIG. 10, client device 904 can be a variety of computing devices capable of receiving data and running one or more services, including, e.g., application 905. In an example, client device 904 can include a server, a distributed computing system, a desktop computer, a laptop, a tablet, a smart phone, a cell phone, a rack-mounted server, and the like.

Client device 904 can receive data from one or more of client devices 910, 911 and from server 916 through I/O interface 1008. I/O interface 1008 can be a type of interface capable of receiving data over a network, including, e.g., an Ethernet interface, a wireless networking interface, a fiber-optic networking interface, a modem, and so forth. Client device 904 also includes a processing device 1014 and memory 1010. A bus system 1012, including, for example, a data bus and a motherboard, can be used to establish and to control data communication between the components of client device 904.

Processing device 1014 can include one or more microprocessors. Generally, processing device 1014 can include an appropriate processor and/or logic that is capable of receiving and storing data, and of communicating over network 902. Memory 1010 can include a hard drive and a random access memory storage device, including, e.g., a dynamic random access memory, or other types of non-transitory machine-readable storage devices. As shown in FIG. 10, memory 1010 stores computer programs that are executable by processing device 1014. These computer programs may include application 905 for implementing the operations and/or the techniques described herein. Application 905 can be implemented in software running on client device 904, hardware or a combination of software and hardware.

In the example of FIG. 10, client device 910 can also be a variety of computing devices capable of receiving data and running one or more services, including, e.g., an application (not shown). In an example, client device 910 can include a server, a distributed computing system, a desktop computer, a laptop, a tablet, a smart phone, a cell phone, a rack-mounted server, and the like.

Client device 910 can receive data from client device 904 and from server 916 through I/O interface 1016. I/O interface 1016 can be a type of interface capable of receiving data over a network, including, e.g., an Ethernet interface, a wireless networking interface, a fiber-optic networking interface, a modem, and so forth. Client device 910 also includes a processing device 1022 and memory 1018. A bus system 1020, including, for example, a data bus and a motherboard, can be used to establish and to control data communication between the components of client device 910.

Processing device 1022 can include one or more microprocessors. Generally, processing device 1022 can include an appropriate processor and/or logic that is capable of receiving and storing data, and of communicating over network 902. Memory 1018 can include a hard drive and a random access memory storage device, including, e.g., a dynamic random access memory, or other types of non-transitory machine-readable storage devices. As shown in FIG. 10, memory 1018 stores computer programs that are executable by processing device 1022. These computer programs may include an application (not shown) for implementing the operations and/or the techniques described herein. The application can be implemented in software running on client device 910, hardware or a combination of software and hardware.

Figure 11:
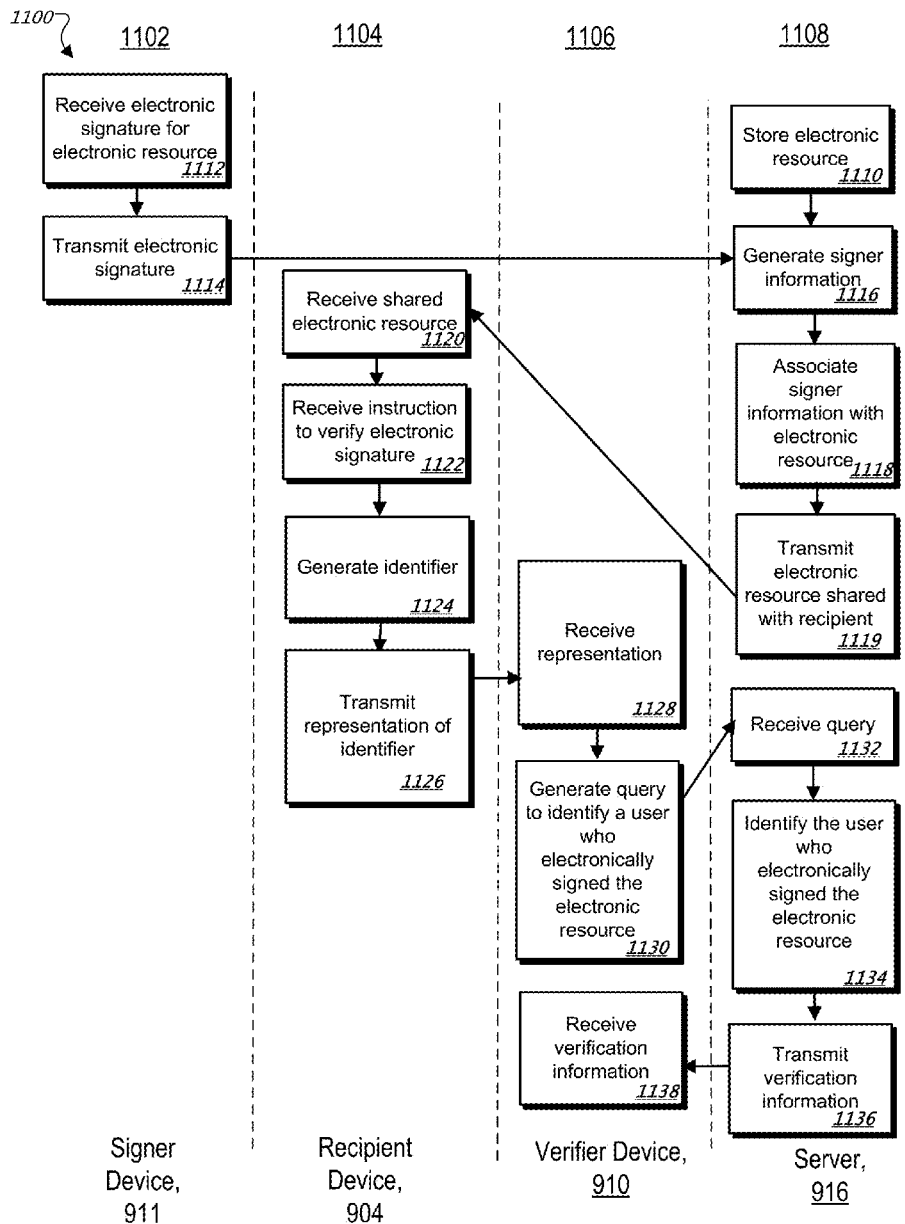
FIG. 11 is a flowchart showing an example of a process for third party verification of an electronically signed electronic resource.

FIG. 11 is a flowchart showing an example of a process 1100 for third party verification of an electronically signed electronic resource. In FIG. 11, process 1100 is split into parts 1102, 1104, 1106, 1108. Part 1102 may be performed by signer device 911. Part 1104 may be performed by recipient device 904 (and/or by application 905 running on recipient device 904). Part 1106 may be performed by verifier device 910 (and/or by an application running on verifier device 910). Part 1108 may be performed by server 916 (and/or by an application running on server 916).

In operation, server 916 stores (1110) an electronic resource, e.g., electronic resource 920 (FIG. 9). In this example, the electronic resource may be uploaded to server 916 by signer device 911. In this example, a signer may use signer device 911 to electronically sign the electronic resource. In the example of FIG. 11, signer device 911 receives (1112) an electronic signature for the electronic resource. In this example, signer device 911 receives the electronic signature, e.g., by a signer inputting the electronic signature into the electronic resource or by otherwise associating the electronic signature with the electronic resource. Signer device 911 also transmits (1114) the electronic signature to server 916.

Server 916 receives (not shown) the electronic signature. Using contents of the received electronic signature, server 916 generates (1116) signer information, including, e.g., signer information 926. In this example, as part of generating the signer information, server 916 determines information indicative of a name of the signer who electronically signed the electronic resource, information indicative of a title of the signer who electronically signed the electronic resource, and so forth, e.g., based on a credential that the signer selected to use to electronically sign the electronic resource.

Server 916 also associates (1118) the signer information with the electronic resource for which the signer information was generated. In an example, server 916 associates the signer information with the electronic resource by generating an association between the signer information and a reference ID, which references the electronic resource.

In the example of FIG. 11, the electronic resource is shared with a recipient, e.g., a recipient who uses recipient device 904. In this example, the signer of the electronic resource shares the electronic resource with the recipient, e.g., as previously described. Server 916 transmits (1119) the shared electronic resource (or otherwise makes the shared electronic resource accessible) to recipient device 904, which is used by the recipient.

In response, recipient device 904 receives (1120) (or otherwise accesses) the shared electronic resource. In this example, recipient device 904 also receives (1122) an instruction to verify the electronic signature that is applied to the electronic resource. In an example, recipient device 904 receives the instruction by a recipient (e.g., user 906) inputting, into recipient device 904, information indicative of a desire to prove to a third party (e.g., a verifier) an identity of the user who signed the electronic resource.

In response to receipt of the instruction, recipient device 904 generates (1124) an identifier (e.g., identifier 928) that references the shared electronic resource. In another example, rather than recipient device 904 generating the identifier that references the shared electronic resource, server 916 may generate the identifier that references the shared electronic resource. In this example, server 916 transmits (not shown) the identifier that references the shared electronic resource to recipient device 904.

Using the identifier that references the shared electronic resource, recipient device 904 generates (not shown) a representation of the identifier that references the shared electronic resource. In this example, the representation encodes the identifier that references the shared electronic resource. As previously described, the representation may include an alphanumeric code, an ultrasonic audio signal, or a QR code. In this example, recipient device 904 transmits (1126), to verifier device 910, the representation of the identifier that references the shared electronic resource. In response to transmission of the representation, verifier device 910 receives (1128) the representation of the identifier that references the shared electronic resource.

In an example, the representation includes an ultrasonic audio signal. In this example, recipient device 904 causes the representation to be transmitted by using a speaker (not shown) on recipient device 904 to transmit the ultrasonic audio signal to verifier device 910. A microphone (not shown) on verifier device 910 receives the ultrasonic audio signal. In another example, the representation includes an optical machine-readable representation. In this example, verifier device 910 includes a scanning device (not shown). In this example, recipient device 904 causes the representation to be transmitted by displaying the representation such that a verifier can use the scanning device to scan the optical machine-readable representation into verifier device 910. In still another example, the representation includes an alphanumeric representation. In this example, recipient device 904 transmits the alphanumeric representation to verifier device 910, e.g., using one of the above-described techniques.

In response to receipt of the representation of the identifier that references the shared electronic resource, verifier device 910 decodes (not shown) the representation, e.g., to extract the identifier (and/or a reference to the identifier) that is encoded in the representation. Using the identifier, verifier device 910 generates (1130) a query, including, e.g., query 932. In this example, the query includes the identifier (and/or a reference to the identifier) and a request to identify the user who electronically signed the electronic resource.

In an example, verifier device 910 transmits (not shown) the query to server 916. Server 916 receives (1132) the query. In response to receipt of the query, server 916 identifies (1134) the user who electronically signed the shared electronic resource.

In an example, server 916 identifies the user who electronically signed the shared electronic resource by parsing the received query to extract the identifier to the shared electronic resource. Using the identifier, server 916 determines an electronic resource (and/or a resource ID) with an association to the identifier in data repository 918 (FIG. 9). For example, server 916 determines an association between identifier 928 and one or more of resource ID 924 and electronic resource 920. Based on the determined association, server 916 determines signer information that is associated with the electronic resource (and/or the resource ID) that is associated with the identifier. For example, server 916 determines an association in data repository 918 between resource ID 924 and signer information 926. Using the contents of the signer information, server 916 generates verification information, e.g., information that includes an indication of the identity of the user who electronically signed the electronic resource. In an example, the verification information may include information specifying a name of the user who signed the shared electronic resource and/or information specifying a title of the user who signed the shared electronic resource.

In the example of FIG. 11, server 916 transmits (1136) the verification information to verifier device 910. Verifier device 910 receives (1138) the verification information. In response to receipt of the verification information, verifier device 910 renders on a display of verifier device 910 a visualization (e.g., an image) of the verification information, e.g., to enable the verifier to verify the identity of the user who electronically signed the electronic resource.

Using the techniques described herein, an application enables a recipient to receive a shared electronic resource and an identifier that references the shared electronic resource. In this example, the shared electronic resource is electronically signed by a user. The application also enables a computing device used by the recipient to generate a representation of the identifier, with the identifier being encoded in the representation. In this example, the recipient wants to prove an identity of the user who electronically signed the electronic resource to a verifier. The computing device used by the recipient transmits the representation to a computing device used by the verifier. In response, the verifier's computing device decodes the representation to obtain the identifier. Using the identifier, the verifier confirms the identity of the user who electronically signed the electronic resource.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to control the operation of, a processing device. Alternatively or in addition, the program instructions can be encoded on a propagated signal that is an artificially generated signal, e.g., a machine-generated electrical, optical, or electromagnetic signal that is generated to encode data for transmission to suitable receiver apparatus for execution by a processing device. The machine-readable medium can be a machine-readable storage device, a machine-readable storage substrate, a random or serial access memory device, or a combination of one or more of them.

The term "processing device" encompasses all kinds of apparatus, devices, and machines for processing data, including by way of example a programmable processor, a computer, or multiple processors or computers. The processing device can include special purpose logic circuitry, e.g., an FPGA (field programmable gate array) or an ASIC (application-specific integrated circuit). The processing device can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   storing, at a server, an electronic resource that has been electronically signed by a signing user and shared with a recipient user;
   associating the electronic resource with a resource identifier;
   receiving, from a recipient device of the recipient user and indication that a verifying users wishes to verify an identity of the signing user;
   in response to receiving the indication, generating an identifier that references the resource identifier;
   providing the identifier to the recipient device;
   receiving, at the server and from a verifier device of a verifying user, a request to verify an identity of the signing user who electronically signed the electronic resource shared with the recipient user, the request including the identifier, with the verifying user differing from each of the signing user and the recipient user, and with the verifier device differing from a signing device of the signing user and the recipient device of the recipient user;
   responsive to receiving the request to identify the signing user who electronically signed the electronic resource, identifying, based on the identifier, the electronic resource stored at the server;
   responsive to identifying the electronic resource stored at the server,
   accessing signer information specifying an identity of the signing user who electronically signed the electronic resource;
   based on the signer information, identifying that the signing user electronically signed the identified electronic resource; and
   transmitting, from the server to the verifier device of the verifying user, an indication that verifies that the signing user electronically signed the electronic resource;
   enabling the recipient device to access the electronic resource that has been electronically signed by the signing user, wherein the recipient device is used by the recipient user with whom the electronic resource is shared;
   wherein the recipient device transmits, to the verifier device, a representation of the identifier that is associated with the electronic resource; and
   wherein the verifier device uses the representation of the identifier that is associated with the electronic resource in generating the request to identify the signing user who electronically signed the electronic resource;
   wherein the representation of the identifier for the electronic resource comprises one or more of an alphanumeric representation, an ultrasonic audio signal representation, and an optical machine-readable representation.

2. The method of claim 1, wherein the identifier for the electronic resource is usable a single time to validate the identity of the signing user who electronically signed the electronic resource.

3. The method of claim 1, wherein transmitting, from the server to the verifier device, the indication of the identity of the signing user who electronically signed the electronic resource comprises:
   transmitting, from the server to the verifier device, information specifying a name of the first user who electronically signed the electronic resource and information specifying a name of the verifying user who requested verification of the electronic signature applied to the electronic resource.

4. The method of claim 1, wherein recipient device generates the identifier and transmits the identifier to the server; and
   wherein associating the electronic resource with the identifier comprises:
   associating the electronic resource with the identifier received from the recipient device.

5. The method of claim 1, further comprising:
   generating, at the server, the identifier that is associated with the electronic resource that has been electronically signed by the signing user; and
   transmitting the identifier to the recipient device;
   wherein associating the electronic resource with the identifier comprises:
   associating the electronic resource with the identifier generated at the server.

6. The method of claim 1, wherein identifying the signing user who electronically signed the identified electronic resource comprises:
   identifying, in a database, an association between information indicative of the identified electronic resource and the signer information, wherein the signer information comprises information specifying the identity of the signing user who electronically signed the identified electronic resource.

7. The method of claim 1, wherein the signing user comprises a first user, and wherein the method further comprises:
   receiving, at the server, information specifying an identity of a second user who has electronically signed the electronic resource that is also electronically signed by the first user;
   wherein responsive to identifying the electronic resource stored at the server, identifying the first user who electronically signed the identified electronic resource comprises:
   responsive to identifying the electronic resource stored at the server, identifying the first user and the second user who electronically signed the identified electronic resource; and
   wherein transmitting, from the server to the verifier device, an indication of the identity of the first user who electronically signed the electronic resource comprises:

transmitting, from the server to the verifier device, an indication of identities of the first user and the second user who electronically signed the electronic resource.

8. One or more non-transitory machine-readable media configured to store instructions that are executable by one or more processing devices to perform operations comprising:
   storing, at a server, an electronic resource that has been electronically signed by a signing user and shared with a recipient user;
   associating the electronic resource with a resource identifier;
   receiving, from a recipient device of the recipient user and indication that a verifying users wishes to verify an identity of the signing user;
   in response to receiving the indication, generating an identifier that references the resource identifier;
   providing the identifier to the recipient device;
   receiving, at the server and from a verifier device of a verifying user, a request to verify an identity of the signing user who electronically signed the electronic resource shared with the recipient user, the request including the identifier, with the verifying user differing from each of the signing user and the recipient user, and with the verifier device differing from a signing device of the signing user and the recipient device of the recipient user;
   responsive to receiving the request to identify the signing user who electronically signed the electronic resource, identifying, based on the identifier, the electronic resource stored at the server;
   responsive to identifying the electronic resource stored at the server,
   accessing signer information specifying an identity of the signing user who electronically signed the electronic resource;
   based on the signer information, identifying that the signing user electronically signed the identified electronic resource; and
   transmitting, from the server to the verifier device of the verifying user, an indication that verifies that the signing user electronically signed the electronic resource;
   enabling the recipient device to access the electronic resource that has been electronically signed by the signing user, wherein the recipient device is used by the recipient user with whom the electronic resource is shared;
   wherein the recipient device transmits, to the verifier device, a representation of the identifier that is associated with the electronic resource; and
   wherein the verifier device uses the representation of the identifier that is associated with the electronic resource in generating the request to identify the signing user who electronically signed the electronic resource;
   wherein the representation of the identifier for the electronic resource comprises one or more of an alphanumeric representation, an ultrasonic audio signal representation, and an optical machine-readable representation.

9. The non-transitory machine readable media of claim 8, wherein the identifier for the electronic resource is usable a single time to validate the identity of the signing user who electronically signed the electronic resource.

10. The non-transitory machine readable media of claim 8, wherein transmitting, from the server to the verifier device, the indication of the identity of the signing user who electronically signed the electronic resource comprises:
   transmitting, from the server to the verifier device, information specifying a name of the first user who electronically signed the electronic resource and information specifying a name of the verifying user who requested verification of the electronic signature applied to the electronic resource.

11. The non-transitory machine readable media of claim 8, wherein recipient device generates the identifier and transmits the identifier to the server; and
   wherein associating the electronic resource with the identifier comprises:
   associating the electronic resource with the identifier received from the recipient device.

12. The non-transitory machine readable media of claim 8, further comprising:
   generating, at the server, the identifier that is associated with the electronic resource that has been electronically signed by the signing user; and
   transmitting the identifier to the recipient device;
   wherein associating the electronic resource with the identifier comprises:
   associating the electronic resource with the identifier generated at the server.

13. The non-transitory machine readable media of claim 8, wherein
   identifying the signing user who electronically signed the identified electronic resource comprises:
   identifying, in a database, an association between information indicative of the identified electronic resource and the signer information, wherein the signer information comprises information specifying the identity of the signing user who electronically signed the identified electronic resource.

14. The non-transitory machine readable media of claim 8, wherein the signing user comprises a first user, and wherein the non-transitory machine readable media further comprises:
   receiving, at the server, information specifying an identity of a second user who has electronically signed the electronic resource that is also electronically signed by the first user;
   wherein responsive to identifying the electronic resource stored at the server, identifying the first user who electronically signed the identified electronic resource comprises:
   responsive to identifying the electronic resource stored at the server, identifying the first user and the second user who electronically signed the identified electronic resource; and
   wherein transmitting, from the server to the verifier device, an indication of the identity of the first user who electronically signed the electronic resource comprises:
   transmitting, from the server to the verifier device, an indication of identities of the first user and the second user who electronically signed the electronic resource.

15. An electronic system comprising:
   an hardware processor;
   a server, comprising a memory; and
   one or more machine-readable media configured to store instructions that are executable by the server to perform operations comprising:
   storing, at the server, an electronic resource that has been electronically signed by a signing user and shared with a recipient user;
   associating the electronic resource with a resource identifier;

receiving, from a recipient device of the recipient user and indication that a verifying users wishes to verify an identity of the signing user;

in response to receiving the indication, generating an identifier that references the resource identifier;

providing the identifier to the recipient device;

receiving, at the server and from a verifier device of a verifying user, a request to verify an identity of the signing user who electronically signed the electronic resource shared with the recipient user, the request including the identifier, with the verifying user differing from each of the signing user and the recipient user, and with the verifier device differing from a signing device of the signing user and the recipient device of the recipient user;

responsive to receiving the request to identify the signing user who electronically signed the electronic resource, identifying, based on the identifier, the electronic resource stored at the server;

responsive to identifying the electronic resource stored at the server, accessing signer information specifying an identity of the signing user who electronically signed the electronic resource;

based on the signer information, identifying that the signing user electronically signed the identified electronic resource; and transmitting, from the server to the verifier device of the verifying user, an indication that verifies that the signing user electronically signed the electronic resource;

enabling the recipient device to access the electronic resource that has been electronically signed by the signing user, wherein the recipient device is used by the recipient user with whom the electronic resource is shared;

wherein the recipient device transmits, to the verifier device, a representation of the identifier that is associated with the electronic resource; and wherein the verifier device uses the representation of the identifier that is associated with the electronic resource in generating the request to identify the signing user who electronically signed the electronic resource;

wherein the representation of the identifier for the electronic resource comprises one or more of an alphanumeric representation, an ultrasonic audio signal representation, and an optical machine-readable representation.

16. The electronic system of claim 15, wherein the identifier for the electronic resource is usable a single time to validate the identity of the signing user who electronically signed the electronic resource.

17. The electronic system of claim 15, wherein transmitting, from the server to the verifier device, the indication of the identity of the signing user who electronically signed the electronic resource comprises:

transmitting, from the server to the verifier device, information specifying a name of the first user who electronically signed the electronic resource and information specifying a name of the verifying user who requested verification of the electronic signature applied to the electronic resource.

\* \* \* \* \*